US009396192B2

(12) United States Patent
Wheatley et al.

(10) Patent No.: US 9,396,192 B2
(45) Date of Patent: Jul. 19, 2016

(54) SYSTEMS AND METHODS FOR ASSOCIATING TAGS WITH MEDIA ASSETS BASED ON VERBAL INPUT

(71) Applicant: United Video Properties, Inc., Santa Clara, CA (US)

(72) Inventors: David John Wheatley, Tower Lakes, IL (US); Kenneth Murphy, Fort Washington, PA (US)

(73) Assignee: Rovi Guides, Inc., San Carlos, CA (US)

( * ) Notice: Subject to any disclaimer, the term of this patent is extended or adjusted under 35 U.S.C. 154(b) by 298 days.

(21) Appl. No.: 14/090,600

(22) Filed: Nov. 26, 2013

(65) Prior Publication Data

US 2015/0149473 A1 May 28, 2015

(51) Int. Cl.
*G06F 7/00* (2006.01)
*G06F 17/30* (2006.01)

(52) U.S. Cl.
CPC .................................. *G06F 17/3002* (2013.01)

(58) Field of Classification Search
CPC ............... H04N 21/4147; H04N 21/42203; H04N 21/4622; H04N 21/47202
USPC .......................................................... 707/741
See application file for complete search history.

(56) References Cited

U.S. PATENT DOCUMENTS

| 8,595,771 B1* | 11/2013 | Sharma | H04N 5/44543 725/37 |
| 8,930,308 B1* | 1/2015 | Johnson | G06F 17/30899 707/610 |
| 2008/0120325 A1* | 5/2008 | Davis | G06F 17/30035 |
| 2009/0055759 A1* | 2/2009 | Svendsen | G11B 27/00 715/764 |
| 2009/0172150 A1* | 7/2009 | Alkov | G10L 15/1822 709/224 |
| 2011/0106536 A1* | 5/2011 | Klappert | G06Q 30/02 704/246 |
| 2011/0107215 A1* | 5/2011 | Klappert | G06F 3/167 715/716 |
| 2011/0246937 A1* | 10/2011 | Roberts | G11B 27/034 715/810 |
| 2012/0239661 A1* | 9/2012 | Giblin | G06F 17/30817 707/741 |
| 2012/0323925 A1* | 12/2012 | Fitzsimmons | G06F 17/30038 707/741 |
| 2013/0170818 A1* | 7/2013 | Klappert | G06Q 50/01 386/299 |
| 2013/0297706 A1* | 11/2013 | Arme | G06F 17/30038 709/206 |
| 2014/0006423 A1* | 1/2014 | Melnychenko | G06F 17/3053 707/749 |
| 2014/0007154 A1* | 1/2014 | Seibold | H04N 21/4122 725/25 |
| 2014/0258268 A1* | 9/2014 | Woods | G11B 27/10 707/722 |
| 2014/0270201 A1* | 9/2014 | Kocalar | H04R 1/1041 381/58 |
| 2015/0163558 A1* | 6/2015 | Wheatley | H04N 21/6587 725/12 |

* cited by examiner

*Primary Examiner* — Binh V Ho
(74) *Attorney, Agent, or Firm* — Ropes & Gray LLP

(57) ABSTRACT

Systems and methods for tagging a media asset are provided. A plurality of communications is received from a plurality of users. Each of the plurality of communications includes words spoken by a respective one of the users while accessing the media asset and is associated with a media asset play position during which the respective words were spoken. A subset of the plurality of communications is selected for which the associated media asset play position is within a range of play positions, the range of play positions being shorter than the duration of the media asset. A word that a threshold number of the selected communications have in common is identified. The word is cross-referenced with an attribute database to retrieve an attribute associated with the word. The retrieved attribute is assigned to the media asset within the range of play positions.

20 Claims, 6 Drawing Sheets

600

Words Spoken During Media Asset (American Idol)

| User | Words | Time Stamp |
|---|---|---|
| User 1 | This Guy is Good | 7:14 |
| User 2 | I Like this Guy | 7:12 |
| User 3 | This Guy Rocks | 7:16 |
| User 4 | Good | 7:18 |
| User 5 | This is Funny | 7:25 |
| User 6 | Nice Job | 7:03 |
| User 7 | Funny | 7:26 |
|  |  |  |

FIG. 6

Attribute Database 700

| Word | Attribute |
|---|---|
| "Funny", "haha", "LoL" | Comedy |
| "Scared", "Scary", "Oh My", "ah" | Thriller |
| "aww", "Sweet", "Love" | Drama |
| ... | ... |

FIG. 7

SYSTEMS AND METHODS FOR ASSOCIATING TAGS WITH MEDIA ASSETS BASED ON VERBAL INPUT

BACKGROUND

Traditional systems allow users to associate comments with specific media assets or segments. These systems however fail to account for the lack of standardization between different comments users have. The traditional systems also only consider when (e.g., time stamps) the comments were made but fail to identify the reasons behind the user comments and specifically to whom or what in the media asset they pertain. Accordingly, the traditional systems fail to provide accurate search results and recommendations as such search and recommendation engines operate with standardized terms and look for deeper connections within media assets.

SUMMARY

In view of the foregoing, systems and methods for associating tags with media assets based on verbal input in accordance with various embodiments of the present invention are provided.

In some embodiments, a plurality of communications may be received (e.g., at a remote server) from a plurality of users. Each of the plurality of communications may include words spoken by a respective one of the users while accessing the media asset. Each communication may be associated with a media asset play position during which the respective words were spoken. The play position may be a position after the start time of the media asset. In some implementations, each communication may be generated automatically as each device monitors verbal input from a user accessing media on the device. In some implementations, users may opt in or opt out of having their verbal input monitored while accessing a media asset. In some implementations, users who select an option to have their verbal input monitored while accessing a media asset, may receive permission to access the media asset at a lower price than other users who do not select the option. In some implementations, users who select an option to have their verbal input monitored while accessing a media asset may receive access to the media asset without advertisements or with a limited smaller set of advertisements than other users who do not select the option. In some implementations, each of the plurality of users is located in a different household or home when accessing the media asset.

Each user equipment may convert speech received from a given user while accessing the media asset into digital form, add an identifier of the media asset and a play position at which the speech was received and transmit the information in a communication to the remote server.

A subset of the plurality of communications may be selected (e.g., by the remote server) for which the associated media asset play position is within a range of play positions, the range of play positions being shorter than duration of the media asset. Specifically, the remote server may select a play position range that corresponds to a portion or segment of the media asset of interest (e.g., a popular scene of the media asset). The remote server may process the play positions of the communications it receives to determine which of the communications includes words/phrases spoken at a play position that is within the selected range.

A word that a threshold number of the selected communications have in common is identified. In some implementations, the remote server may set the threshold number to be a majority, minority, specified number, dynamic number, super majority or any combination thereof of the selected communications. The remote server may select a word from each of the selected communications and determine whether the word or related words are repeated in other selected communications. The remote server may repeat this process for each word in each selected communication. The remote server may determine which word/words/phrases appear in, for example, 20 percent of the selected communications and assign the determined word to be the word/phrase the selected communications have in common.

The word is cross-referenced with an attribute database to retrieve an attribute associated with the word. The retrieved attribute is assigned to the media asset within the range of play positions.

In some embodiments, the remote server may receive a user or device request for a search or recommendation based on a given attribute. In some implementations, the attribute is different from the identified common word. The remote server may search for media assets associated with the given attribute and return a list of such media assets based on the request to the user or device.

In some embodiments, the attribute may be associated with a subject (e.g., person, character, actor, object) that appears in the media asset. In such circumstances, closed-captioning information corresponding to the range of play positions may be retrieved. A subject may be identified based on the retrieved closed-captioning information. In particular, the remote server may determine whose speech corresponds to the closed-captioning information. In some implementations, the remote server may cross-reference a database of images of members on a cast list associated with the media asset with an image of the subject that appears when the closed-captioning information is presented. Specifically, the remote server may cross-reference images of members on a cast list with an image of the subject that appears at the range of play positions. The attribute may be associated with the identified subject. In some implementations, the remote server may transmit the attribute and media asset information and play position range to a website or social network page associated with the subject.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 6 shows an illustrative database of communications with words spoken by different users while accessing a media asset in accordance with an embodiment of the invention;

FIG. 7 shows an illustrative database of attributes associated with words spoken by users in accordance with an embodiment of the invention.

DETAILED DESCRIPTION

Figure 1:
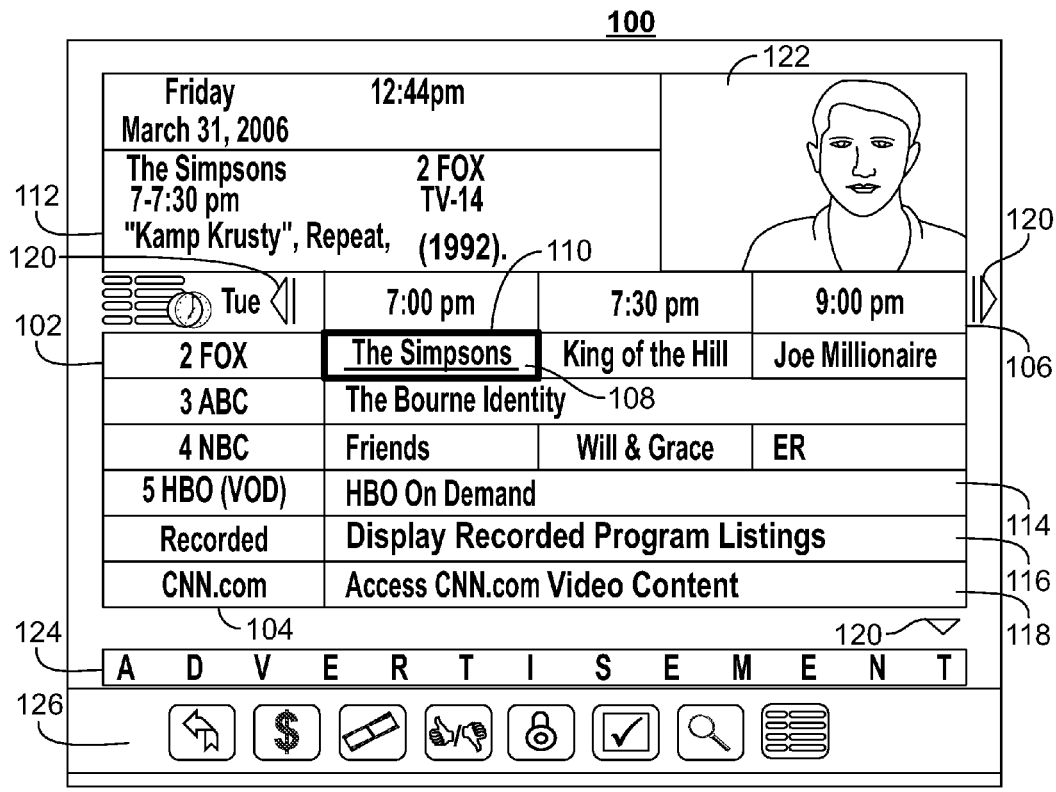
FIGS. 1 and 2 show illustrative display screens that may be used to provide media guidance application listings in accordance with an embodiment of the invention.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), user-generated content (e.g., video or music content), long-form content (e.g., television shows, movies, etc.), user uploaded content, short-form content (e.g., user-generated content, video, music content, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), messages from a crowd of users on a social network, messages from a crowd of users posted to a blog or website, genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections. In some implementations, this data may be referred to as a data feed. As referred to herein the term "crowd" should be understood to mean any number of users greater than one.

Figure 2:
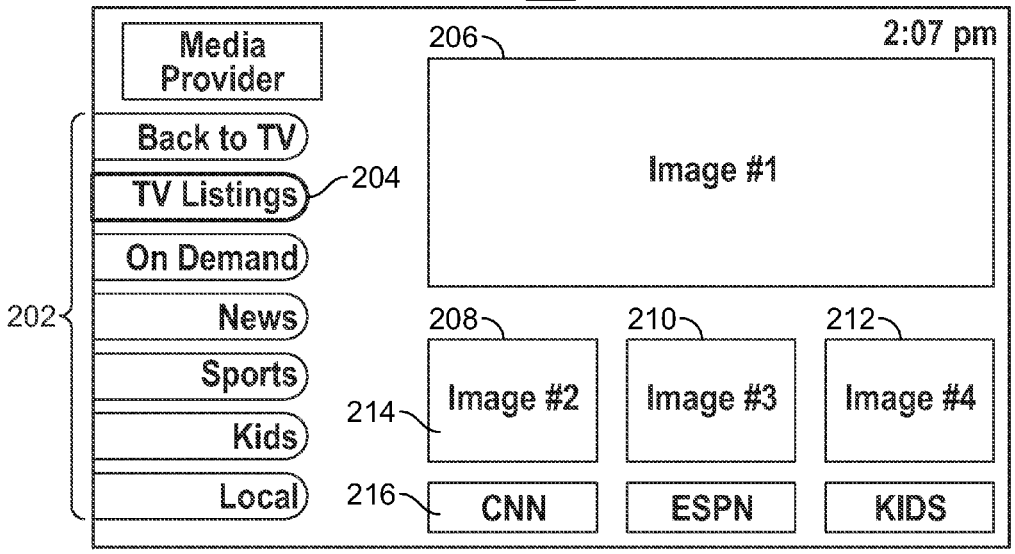
Figure 5:
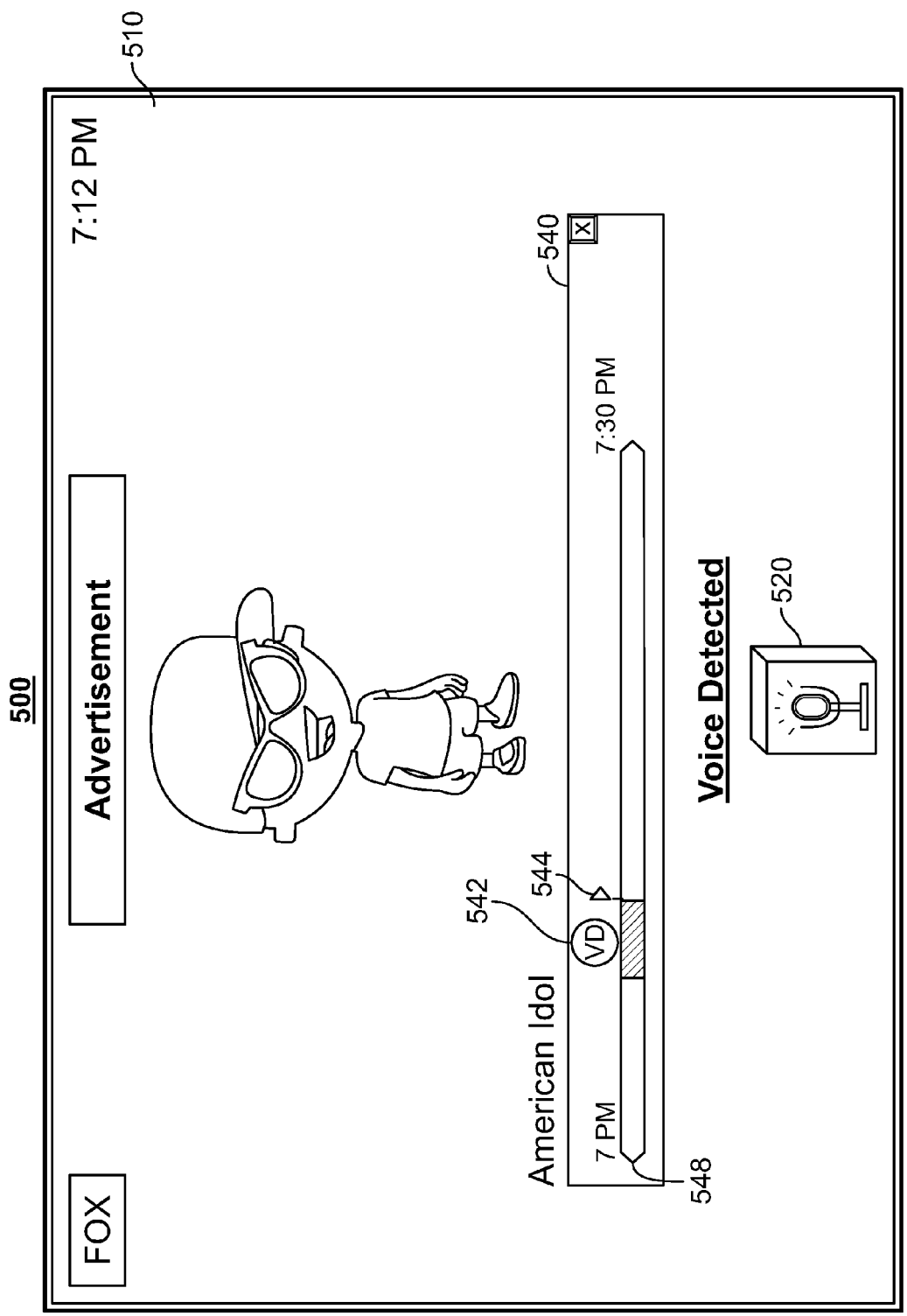
FIG. 5 shows an illustrative display screen of verbal input received while a media asset is accessed in accordance with an embodiment of the invention.

FIGS. 1-2 show illustrative display screens that may be used to provide media guidance data. The display screens shown in FIGS. 1-2 and 5 may be implemented on any suitable user equipment device or platform. While the displays of FIGS. 1-2 and 5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

As referred to herein, the phrase "in response" should be understood to mean automatically, directly and immediately as a result of, without further input from the user, or automatically based on the corresponding action where intervening inputs or actions may occur.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to, or alternative to, providing access to linear programming (e.g., content that is scheduled to be transmitted to a plurality of user equipment devices at a predetermined time and is provided according to a schedule), the media guidance application may also provide access to non-linear programming (e.g., content accessible to a user equipment device at any time and not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other airtimes or ways of receiving a program, recording a program, enabling series recording of a program, setting program and/or channel as a favorite, purchasing a program, identifying media asset segment start and end times, performing a fast-access playback operation, performing a jump segment operation or skip commercials operation, or other features. Options available from a main menu display may include search options, VOD options (e.g., fast-access playback operations), parental control options, Internet options, cloud-based options, device synchronization options, like options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. The user profile information may include identifiers of one or more social networks or blogs the user is associated with. For each social network or blog a username and password (e.g., log-in information) may be stored in the user profile information. Control circuitry 304 may utilize this information in the user profile to automatically access the social network or blog to post or transmit information/content/segments to or retrieve information/contents/segments from the social network or blog. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
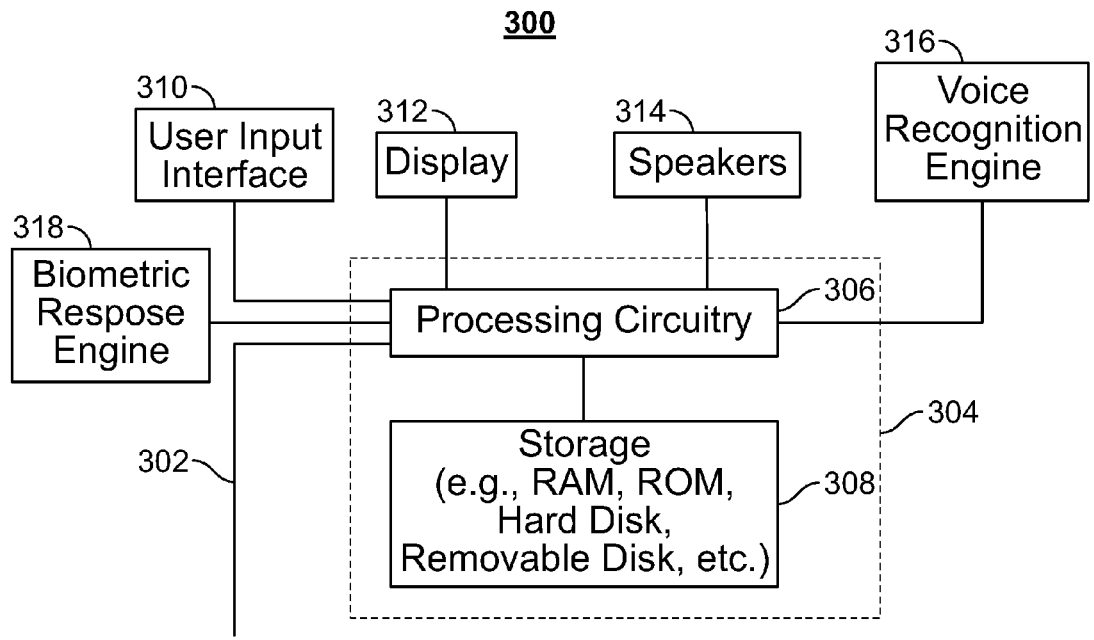
FIG. 3 shows an illustrative user equipment device in accordance with another embodiment of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

In some embodiments, a viewing history may be stored in storage 308 for a user. The viewing history may include indications of which media assets have been viewed by a given user. The viewing history may also include, for each media asset, which portion or portions have or have not been viewed by the user. In some implementations, the viewing history may include indications of which users in a group of users have seen or viewed a media asset or a particular segment of a media asset. The group of users may be users in a certain geographical location (e.g., in the same home) or users that are associated with each other on a social network.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

Figure 8:
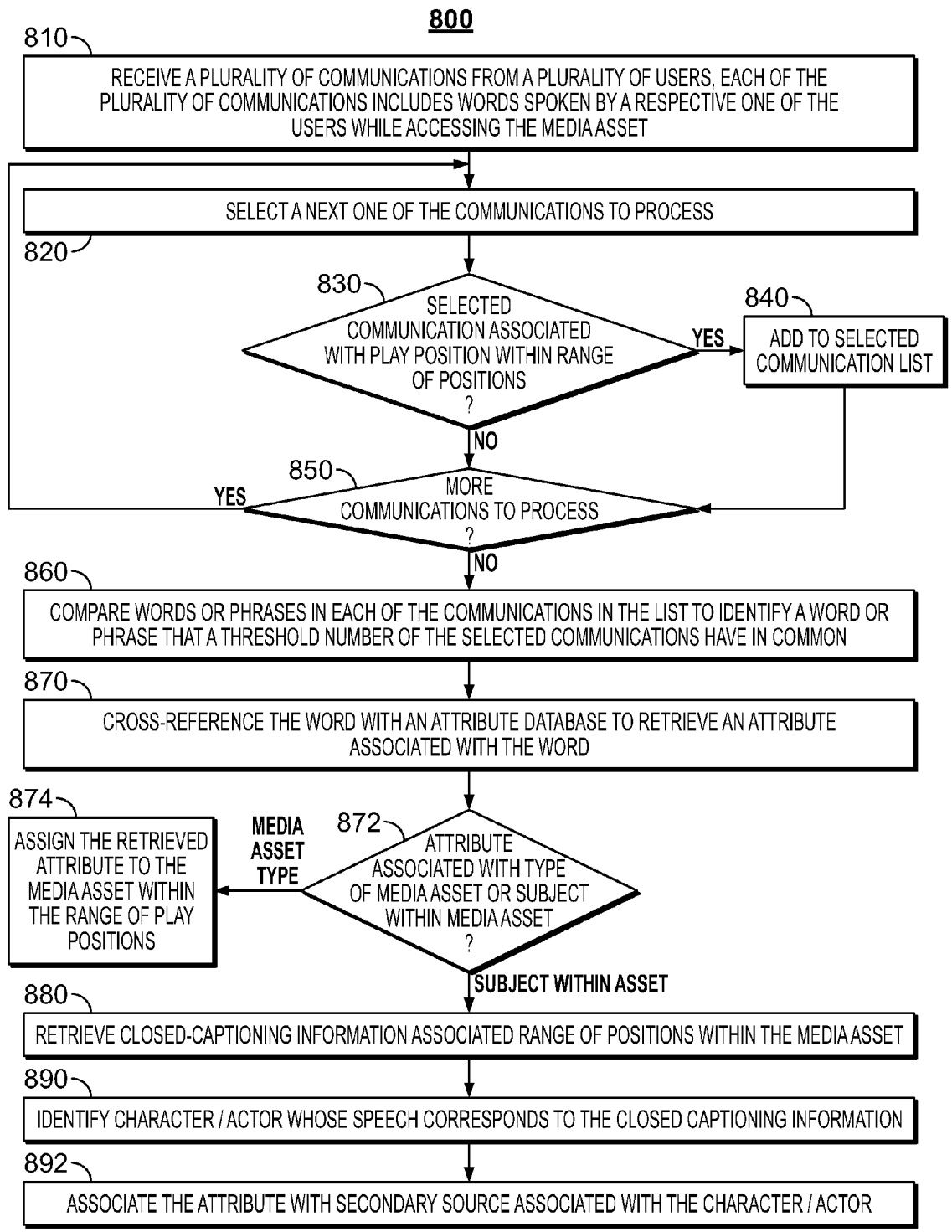
FIG. 8 is a diagram of a process for associating tags with media assets based on verbal input in accordance with embodiments of the invention.

In some embodiments, control circuitry 304 may include voice or verbal input processing circuitry, such as a voice recognition engine 316. This voice or verbal input processing circuitry may include any interface that performs a voice recognition process. Control circuitry 304 may continuously or periodically access the microphone of user input interface 310 to detect the presence of voice input. Upon detecting voice input, control circuitry 304 may utilize voice recognition engine 316 (implemented in software or with dedicated circuitry) to identify words/phrases in the voice input. As used herein, voice input, speech input, spoken words, speech, and verbal input are interchangeable terms and should be understood to have the same meaning. The voice recognition process may perform analog-to-digital conversion on the voice input and process the digital information to form a digital representation of the voice input (e.g., a digital sentence with the identified words/phrases). The voice recognition process may output to another component of control circuitry 304 the identified or extracted words or phrases for further processing. For example, voice recognition engine 316 may transmit the digital representation of the voice input (e.g., a sentence, word, words and/or phrase) to a remote server as a communication. The remote server may collect all of the voice inputs it receives and process the voice inputs as communications in accordance with process 800 (FIG. 8). In some implementations, voice recognition engine 316 may be implemented to only respond to a voice received from a particular user or group of users. For example, in an environment where multiple users are present and from whom all of their voices are received by user input interface 310, control circuitry 304 may only respond to one or a selected few of the voices. This way, only one or the selected members of the users can be authorized to provide instructions using verbal commands to control circuitry 304.

In some embodiments, control circuitry 304 may include a biometric response engine 318. Biometric response engine 318 may include circuitry that remotely or directly monitors a user's physiological and physical responses to content being presented. For example, biometric response engine 318 may include a heart pulse rate monitor, facial expression or position detection circuitry, eye movement and position detection circuitry, breathing pattern detection circuitry, user position and orientation detection circuitry, and/or any combination thereof. Control circuitry 304 may continuously or periodically access biometric response engine 318 to detect any changes in physiological and/or physical attributes of a user at or during specified sections of a media content being presented. Upon detecting a change in the biometric response of the user, control circuitry 304 may utilize a biometric response database to identify a corresponding set of instructions to perform. In some implementations, biometric response engine 318 may be implemented to respond only to biometric responses of a particular user or group of users. For example, in an environment where multiple users are present and from whom all of their biometric responses are received, control circuitry 304 may respond to only one or a selected few of the biometric responses.

The biometric response database may include a mapping between a given biometric response and a set of instructions for processing by control circuitry 304. For example, a biometric response entry in the biometric response database may include a voice command keyword (e.g., playback, pause, record, rewind, fast-forward, change channel, channel up, channel down, access source 1, access source 2) and the corresponding instructions may be stored for the entry that instruct control circuitry 304 to perform the function identified by the keyword.

In some implementations, the biometric response database entry may include a combination of biometric responses and corresponding instruction. For example, a biometric response entry in the biometric response database may include a detection or determination that two or more users have engaged in a conversation (e.g., looked away from the screen at a given moment and exchanged verbal utterances) and the corresponding instructions may be stored for the entry that instruct control circuitry 304 to monitor the conversation and generate a communication with the spoken words of phrases for transmission to the remote server. Specifically, two or more users may be viewing a given media asset and at a particular point in time, an event in the media asset happens that causes the users to engage in conversation. In response, biometric response engine 318 may identify this moment and may automatically digitize the words the users speak and transmit those words as a communication to the remote server. The communication may identify the media asset being viewed and the play position within the media asset during which the users engaged in the conversation. In some embodiments, the communication may omit the names or identities of the users for privacy reasons.

In client-server-based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, microphone, touch screen, touchpad, stylus input, joystick, voice recognition interface, or other user input interfaces. User input interface 310 may include keys or displayed options that enable a user to instruct control circuitry 304 to mark a segment as a liked segment (e.g., to start/stop marking of a liked segment). Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
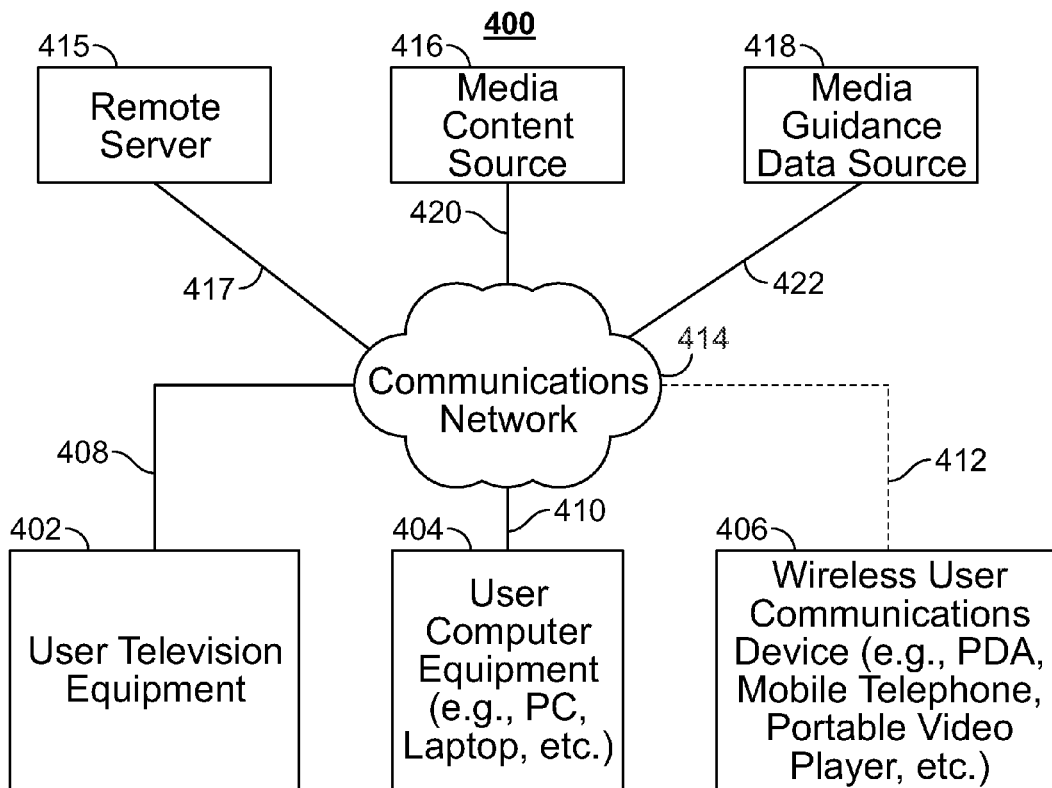
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Each user of the user equipment devices may be associated with different users in a crowd of users. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of remote server 415. When executed by control circuitry of remote server 415 (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites, blogs, news sites, or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, access to messages posted by users in a crowd, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, control circuitry 304 (of a user equipment device or remote server 415) may retrieve a media asset (or portion of the media asset) from storage 308 or receive a live transmission or broadcast of the media asset from a content source. Control circuitry 304 may present the media asset and monitor for receipt of verbal input from the user. In response to receiving verbal input from the user, control circuitry 304 may determine whether the verbal input corresponds to an authorized or registered user. When the verbal input is received from an authorized user, control circuitry 304 may process the verbal input to generate a communication that includes a digitized version of the verbal input with the words the user spoke while accessing the media asset. Control circuitry 304 may store an indication of a current playback position at the time the verbal input was received or a position that precedes the playback position when the verbal input was received by a predetermined amount (e.g., 5 seconds). Control circuitry 304 may add the playback position, as well as an identifier of the media asset (e.g., a title of the media asset) to the communication for transmission to remote server 415. Remote server 415 may analyze all such communications received from various users to identify common words/phrases that occur within a range of playback positions (e.g., between 3 minutes and 4 minutes following the start time of the media asset). The common words/phrases may be cross-referenced with a database of attributes to retrieve an attribute associated with the words of phrases. The attribute may then be associated with the media asset and used for future searches and/or recommendations to users.

FIG. 5 shows an illustrative display screen of verbal input received while a media asset is accessed in accordance with an embodiment of the invention. Screen 500 includes a media asset 510, an information overlay 540, and a voice detection indicator 520.

The media asset displayed in screen 500 may be a linear or non-linear media asset. For example, in some implementations, the media asset may be a live broadcast of an event. A user may be consuming the media asset and provide verbal input to control circuitry 304 about the media asset 510 or control circuitry 304 may monitor biometric information of the user while the user consumes media asset 510. In response to receiving a user request for further information, control circuitry 304 may generate for display information overlay 540. Information overlay 540 may include any information identifying or describing media asset 510 (e.g., a title, detailed description, content rating, etc.) and a transport bar 548. Transport bar 548 may indicate to the user a current position 544 within media asset 510 relative to a start time and an end time of media asset 510. In some embodiments, information overlay 540 may not be displayed at all before or after verbal input is received from the user.

In some embodiments, control circuitry 304 may monitor for verbal input from the user while the user consumes media asset 510. In some embodiments, control circuitry 304 may automatically (without user input) continuously or periodically process verbal input received from the user. In some embodiments, control circuitry 304 may process verbal input in response to receiving a user selection of visual indicator 520. Specifically, the user may press or select visual indicator 520 while speaking and release the button or unselect indicator 520 when the user finishes speaking. In some embodiments, control circuitry 304 may be associated with a user that is part of a population of users selected to have verbal input analyzed during content consumption. Specifically, the user may be provided an option (not shown) to participate in having their voice or verbal input processed by remote server 415 to assist in tagging content. In some implementations, in response to receiving a user selection of the option to participate, the cost for accessing the media asset during which the verbal input is monitored may be reduced. Alternatively or in addition, in response to receiving a user selection of the option to participate, the media asset during which the verbal input is monitored may be presented to the user without advertisements or with a limited set of advertisements. The limited set of advertisements may be lower or shorter than that presented to a portion of the population that does not participate in having its verbal input monitored during access to the media asset. Participation in the population for which verbal input is monitored may occur automatically in response to receiving a user selection of visual indicator 520. The monitoring of the verbal input of the user terminates when the corresponding media asset concludes. In certain embodiment, visual indicator 520 may not be displayed or presented to the user. For example, the user may press a button on a remote control to initiate verbal input monitoring. Alternatively, verbal input may be monitored automatically and in such circumstances, visual indicator 520 may not be displayed.

Control circuitry 304 may process the verbal input received during the period of time indicator 520 was actuated or selected by the user. Visual indicator 520 may be displayed persistently or intermittently to allow a user to input a request to provide verbal input. Alternatively, when control circuitry 304 continuously or periodically monitors for verbal input, control circuitry 304 displays indicator 520 to inform the user that a verbal input has been detected and is being monitored.

In response to determining that the verbal input has been received, control circuitry 304 may process the verbal input to generate the communication for transmission to remote server 415. The communication may be transmitted without receiving a user request to transmit the communication to remote server 415. In some implementations, control circuitry 304 may display a visual indicator 542 in transport bar 548 to indicate to the user the relative playback time of when the verbal input was received.

In some embodiments, control circuitry 304 may process the received verbal input to generate a string with words/phrases in the verbal input. Specifically, control circuitry 304 may generate a string that includes the words spoken by the user while accessing media asset 510. Control circuitry 304 may retrieve the identifier of the media asset that is presented in transport bar 548 from a storage device. Control circuitry 304 may also retrieve play position 542 that identifies at what play position in the media asset the words were spoken by the user. Control circuitry 304 may generate a communication using a data packet that includes the words/phrases, media asset identifier and the associated play position. Control circuitry 304 may transmit the generated communication to remote server 415.

Remote server 415 may receive communications from multiple users. The multiple users may be at different households, homes, locations, and/or geographical regions. In some implementations, the multiple users may be in the same location, household, home or geographical region and/or may be a mix between users at different locations and users at the same location. Remote server 415 may add each communication to a database 600 (FIG. 6) of words spoken during a given media asset. The database may have multiple fields 630, 640 and 650. Field 630 may identify a given user either uniquely or anonymously. Field 640 may specify the words spoken by the respective user during presentation of the media asset. Field 650 may identify the play position (time stamp) during which the respective user spoke the words. For example, one entry in database 600 may indicate that user 1 spoke the words "This guy is good" approximately at play position 7:14 (e.g., transmission time 7:14 PM or at 7 minutes and 14 seconds past the start time of the media asset).

After receiving a given number of communications from the multiple users (e.g., over 100 communications) or on an ongoing basis (e.g., as each communication is received), remote server 415 may process the communications stored in database 600. Specifically, remote server 415 may process the communications to identify words/phrases, stored in field 640 of a corresponding entry of each communication, which the communications have in common. In some implementations, remote server 415 may reduce the number of database 600 entries it needs to process based on field 650. Specifically, remote server 415 may select a range of play positions (e.g., a 5 minute interval following the start time of the media asset, such as the interval beginning at 10 minutes past the start time and ending at 15 minutes past the start time). Remote server 415 may retrieve any communication entry from database 600 that has an associated play position stored in field 650 that is within the selected range of play positions. For example, remote server 415 may select a first set of entries 610 as having associated play positions within a first selected range of play positions and a second set of entries 620 as having associated play positions with a second selected range of play positions. Remote server 415 may then process that selected subset of communications to identify words/phrases the communications have in common. For example, a scene in a media asset may be known to be popular and, accordingly, remote server 415 may select a range of play positions corresponding to the start and end times of the popular scene.

In some embodiments, remote server 415 may process the communications to identify comments or reactions users have about a person or character associated with the media asset at the play position range. The comments or reactions may then be posted by remote server 415 on a website associated with the person or character. For example, remote server 415 may identify that, in set 610, a threshold number (e.g., a majority or more than half) of the entries in set 610 have the word "Guy" in common. In some implementations, the threshold number may be a minority, a selected number, a dynamic number, user specified number, a super majority and/or any combination thereof. Remote server 415 may determine that the word "Guy" does not identify subject matter and by itself has no meaning. In some implementations, remote server 415 may make this determination in response to determining that the word does not appear in attribute database 700 (FIG. 7). Accordingly, in response to determining that the word by itself cannot be used, remote server 415 may determine a context for that word by processing nearby words. Specifically, remote server 415 may retrieve field 640 of a first entry in set 610 to determine whether the nearby words characterize the word "Guy" in a certain way. Remote server 415 may determine that the word "Good" appears in the first entry. As such, remote server 415 may determine that someone liked a man associated with the media asset at the selected play position range. Similarly, remote server 415 may retrieve field 640 of a second entry in set 610 to determine whether the nearby words characterize the word "Guy" in a certain way. Remote server 415 may determine that the word "like" appears in the first entry. As such, remote server 415 may determine that another person liked a man associated with the media asset at the selected play position range. Remote server 415 may cross-reference an attribute database 700 to associate an attribute with the common word and context. For example, the attribute may be generic to the context, such as "popular" for a person users like.

After processing each communication having the common word to identify a context for the common word, remote server 415 may process information associated with the media asset to identify the person in the media asset being spoken about. For example, remote server 415 may retrieve closed-captioning information associated with the play position range. Remote server 415 may process the closed-captioning information to identify a subject (e.g., an actor, character or person within the media asset). In some implementations, remote server 415 may identify the subject by determining a character whose speech corresponds to the closed-captioning information. In some implementations, remote server 415 may retrieve from the closed-captioning information the name of the character whose speech corresponds to the closed-captioning information. In some implementations, remote server 415 may cross-reference an image of the person whose speech corresponds to the closed-captioning information with a database of images of actors who play a role in the media asset. The list of actors may be retrieved from a cast list associated with the media asset and a website or remote source may be queried to retrieve images of the actors in the cast list. Once remote server 415 identifies an actor whose image corresponds to the image of the character or actor whose speech corresponds to the closed-captioning information, remote server 415 may associate the attribute with the identified actor or person.

In some embodiments, remote server 415 may identify a website associated with the actor or person. For example, remote server 415 may identify a social network page (e.g., FACEBOOK page) associated with the identified actor or person. Remote server 415 may then post automatically or transmit to a server associated with the social network or website the attribute corresponding to the common words and/or an identifier of the media asset and/or play position within the media asset associated with the person or actor in which users spoke the common word/phrase.

In some embodiments, remote server 415 may process the communications to identify subject matter of segments within the media asset at the play position range. For example, remote server 415 may identify that, in set 620, a threshold number (e.g., a majority or more than half) of the entries in set 610 have the word "funny" in common. In some implementations, the threshold number may be a minority, a selected number, a dynamic number, user specified number, a super majority and/or any combination thereof. Remote server 415 may cross-reference an attribute database 700 to associate an attribute with the common word. The attributes listed in database 700 may standardize the words in common to have an industry accepted use. For example, the common word may be identified in word field 710 and the standardized attribute may be identified in attribute field 720. Accordingly, remote server 415 may determine that the attribute associated with the word "funny" is comedy. Remote server 415 may associate comedy with the play position range that was selected and that is associated with set 620. In response to receiving subsequent user requests for comedies, remote server 415 may identify the media asset or media asset segment having the attribute comedy associated with it and provide the identified media asset or segment to the requesting user. In some embodiments, remote server 415 may adjust recommendations made to users based on the assigned attributes. Specifically, remote server 415 may determine a need to recommend a comedy media asset to a user. Based on the associated attribute with the media asset being comedy, remote server 415 may include the media asset having the comedy attribute in a recommendation generated for the user.

FIG. 8 is a diagram of a process 800 for associating tags with media assets based on verbal input in accordance with embodiments of the invention. At step 810, a plurality of communications may be received from a plurality of users. Each of the communications may include words/phrases spoken by a respective user while accessing a media asset. For example, control circuitry 304 of each user equipment may automatically monitor for the presence of speech that occurs while users are viewing a media asset. In response to determining the presence of speech, control circuitry 304 may transmit a communication to remote server 415 that includes a digitized version of the speech and identifier of the media asset and play position at which the speech was detected.

At step 820, a next one of the communications is selected for processing. For example, remote server 415 may select a given entry from database 600.

At step 830, a determination is made as to whether the selected communication is associated with a play position within a range of play positions. In response to determining that the communication is associated with a play position within the range, the process proceeds to step 840, otherwise the process proceeds to step 850. For example, remote server 415 may select a play position range (e.g., a range that corresponds to a given scene or segment of a media asset). Remote server 415 may compare the play position identified in field 650 of the selected entry with the range to determine whether the play position of the entry is within the selected range.

At step 840, the selected communication is added to a list. For example, the selected entry of database 600 corresponding to the communication may be added to set 610 of entries having communications that were made during the selected play position range.

At step 850, a determination is made as to whether more communications are left to be processed. In response to determining more communications are left, the process proceeds to step 820, otherwise the process proceeds to step 860. For example, remote server 415 may determine whether all of the entries in database 600 have been processed.

At step 860, words/phrases in each communication in the list are compared to identify a word or phrase that a threshold number of the selected communications have in common. For example, remote server 415 may identify a word/phrase that repeats among a threshold number (e.g., majority or more than half) of the communications in the list. Remote server 415 may determine whether the word/phrase repeats in a majority, supermajority, minority, user selected, dynamic or any other number of communications. In some embodiments, remote server 415 may determine a word/phrase as one that repeats if the word/phrase is related to another word/phrase. Specifically, if one communication uses the word "Guy" and another communication uses the word "Dude", remote server 415 may determine that "Guy" is the repeating word/phrase because it is related to "Dude" in that they both describe a man or male figure. Remote server 415 may use either or both words to determine whether the word or words appear in other communications.

At step 870, the word/phrase is cross-referenced with an attribute database to retrieve an attribute associated with the word. For example, remote server 415 may cross-reference the word or related words with attribute database 600 to determine whether an attribute exists that is associated with the repeating word or words (FIG. 6).

At step 872, a determination is made as to whether the attribute is associated with a type of media assets or subject within the media asset. In response to determining the attribute is associated with a type, the process proceeds to step 894, otherwise the process proceeds to step 880. For example, in response to determining that the word or words exist in database 600, remote server 415 may determine that the word/words is associated with a type of media asset. Alternatively, in response to determining that the word or words do not exist in database 600, remote server 415 may determine that the word/words are associated with a subject in the media asset.

At step 880, closed-captioning information associated with the range of play positions within the media asset is retrieved. For example, remote server 415 may query an information server for closed-captioning information associated only with the portion of the media asset corresponding to the range of play positions. Specifically, if the range of play positions is the time between 10 minutes past the start time and 15 minutes past the start time, remote server 415 may request all of the closed-captioning information of the media asset that exists in that particular time frame. Other closed-captioning information that exists beyond the range of play positions is not requested or is discarded.

At step 890, a character/actor whose speech corresponds to the closed-captioning information is identified. For example, remote server 415 may retrieve a cast list associated with the media asset. Remote server 415 may determine, based on the cast list, who is speaking the words associated with the closed-captioning information. In some embodiments, remote server 415 may cross-reference an image of each person on the cast list with the image of the person that is presented concurrently with the closed-captioning information during the range of play positions. The matching image is then identified and the actor/person playing the role of the character corresponding to that image is selected.

At step 892, the attribute is associated with a secondary source associated with the character/actor/person. For example, remote server 415 may communicate with a social network server or website associated with the selected actor/person. Remote server 415 may transmit the identified attribute to the social network server or website associated with the actor/person along with the media asset and play position. The website or social network server may include the received information on the web page or social network page associated with the person so other users can search and find information and the attribute associated with the person.

It should be understood, that the above steps of the flow diagrams of FIG. 8 may be executed or performed in any order or sequence not limited to the order and sequence shown and described in the figure. Also, some of the above steps of the flow diagram of FIG. 8 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for tagging a media asset, the method comprising:
    receiving, with control circuitry, a plurality of communications from a plurality of users, wherein each of the plurality of communications includes words spoken by a respective one of the users while accessing the media asset, and wherein each of the communications is associated with a media asset play position during which the respective words were spoken;
    selecting a subset of the plurality of communications for which the associated media asset play position is within a range of play positions, the range of play positions being shorter than a duration of the media asset;
    identifying, with the control circuitry, a word that a threshold number of the selected communications have in common;
    retrieving from an attribute database an attribute associated with the word; and
    assigning the retrieved attribute to the media asset within the range of play positions.

2. The method of claim 1, wherein each of the plurality of users is located in a different household when accessing the media asset.

3. The method of claim 1, wherein the attribute is different from the identified word.

4. The method of claim 1 further comprising:
    retrieving closed-captioning information corresponding to the range of play positions;
    identifying a subject based on the retrieved closed-captioning information; and
    associating the attribute with the identified subject.

5. The method of claim 4, wherein the subject is an actor, character or person within the media asset.

6. The method of claim 4 further comprising:
    identifying a website associated with the subject; and
    causing at least one of the attribute and the identified word to be posted on the website.

7. The method of claim 4, wherein identifying the subject comprises:
    determining a character whose speech corresponds to the closed-captioning information; and
    selecting, as the subject, an actor who is performing a role of the character.

8. The method of claim 4 further comprising processing a cast list associated with the media asset to identify the subject.

9. The method of claim 1, wherein the retrieved attribute includes a genre or category associated with the identified word.

10. The method of claim 1 further comprising generating a recommendation or search result based on the retrieved attribute.

11. A system for tagging a media asset, the system comprising:
    control circuitry configured to:
        receive a plurality of communications from a plurality of users, wherein each of the plurality of communications includes words spoken by a respective one of the users while accessing the media asset, and wherein each of the communications is associated with a media asset play position during which the respective words were spoken;
        select a subset of the plurality of communications for which the associated media asset play position is within a range of play positions, the range of play positions being shorter than a duration of the media asset;

identify a word that a threshold number of the selected communications have in common;

retrieve from an attribute database an attribute associated with the word; and assign the retrieved attribute to the media asset within the range of play positions.

12. The system of claim 11, wherein each of the plurality of users is located in a different household when accessing the media asset.

13. The system of claim 11, wherein the attribute is different from the identified word.

14. The system of claim 11, wherein the control circuitry is further configured to:

retrieve closed-captioning information corresponding to the range of play positions;

identify a subject based on the retrieved closed-captioning information; and associate the attribute with the identified subject.

15. The system of claim 14, wherein the subject is an actor, character or person within the media asset.

16. The system of claim 14, wherein the control circuitry is further configured to:

identify a website associated with the subject; and cause at least one of the attribute and the identified word to be posted on the website.

17. The system of claim 14, wherein the control circuitry is further configured to:

determine a character whose speech corresponds to the closed-captioning information; and select, as the subject, an actor who is performing a role of the character.

18. The system of claim 14, wherein the control circuitry is further configured to process a cast list associated with the media asset to identify the subject.

19. The system of claim 11, wherein the retrieved attribute includes a genre or category associated with the identified word.

20. The system of claim 11, wherein the control circuitry is further configured to generate a recommendation or search result based on the retrieved attribute.

* * * * *